US012749425B2

(12) United States Patent
Park

(10) Patent No.: US 12,749,425 B2
(45) Date of Patent: Sep. 29, 2026

(54) GATE DRIVER, DISPLAY DEVICE INCLUDING THE GATE DRIVER, AND ELECTRONIC DEVICE INCLUDING THE DISPLAY DEVICE

(71) Applicant: Samsung Display Co., LTD., Yongin-si (KR)

(72) Inventor: Junhyun Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/094,878

(22) Filed: Mar. 29, 2025

(65) Prior Publication Data

US 2026/0004700 A1 Jan. 1, 2026

(30) Foreign Application Priority Data

Jun. 27, 2024 (KR) ........................ 10-2024-0084115
Jul. 26, 2024 (KR) ........................ 10-2024-0099444

(51) Int. Cl.
*G09G 3/20* (2006.01)

(52) U.S. Cl.
CPC ..... *G09G 3/2092* (2013.01); *G09G 2300/043* (2013.01); *G09G 2310/0267* (2013.01)

(58) Field of Classification Search
CPC ........... G09G 3/2092; G09G 2300/043; G09G 2310/0267
USPC ........................................................... 345/55
See application file for complete search history.

(56) References Cited

U.S. PATENT DOCUMENTS 10,991,314 B2 4/2021 Park et al.
2023/0105266 A1 * 4/2023 Hong .................. G09G 3/3275 345/212

FOREIGN PATENT DOCUMENTS

CN 108154831 A * 6/2018 ............. G09G 3/006
JP 2006174294 A * 6/2006

* cited by examiner

*Primary Examiner* — Mark Edwards
(74) *Attorney, Agent, or Firm* — CANTOR COLBURN LLP

(57) ABSTRACT

A gate driver includes a first output stage through a N-th output stage and a sensing stage. Each of the first output stage through the N-th output stage is configured to output a gate signal in response to a control node. The sensing stage includes a hold transistor, which is turned on in response to the voltage of the control node, and is configured to sense a threshold voltage of the hold transistor of the sensing stage.

16 Claims, 5 Drawing Sheets

GATE DRIVER, DISPLAY DEVICE INCLUDING THE GATE DRIVER, AND ELECTRONIC DEVICE INCLUDING THE DISPLAY DEVICE

This application claims priority to Korean Patent Application No. 10-2024-0084115, filed on Jun. 27, 2024, and Korean Patent Application No. 10-2024-0099444, filed on Jul. 26, 2024, and all the benefits accruing therefrom under 35 U.S.C. § 119, the contents of which in their entirety are herein incorporated by reference.

BACKGROUND

1. Field

Embodiments supported by aspects of the present disclosure relate to a gate driver, a display device including the gate driver, and an electronic device including the display device. More particularly, aspects supported by the present disclosure relate to a gate driver, a display device including the gate driver, and an electronic device including the display device for improving display quality.

2. Description of the Related Art

In general, a display device includes a display panel and a display panel driver. The display panel includes gate lines, data lines, emission lines, and pixels. The display panel driver includes a gate driver for providing a gate signal to the gate lines, a data driver for providing a data voltage to the data lines, an emission driver for providing an emission signal to the emission lines, and a driving controller for controlling the gate driver, the data driver, and the emission driver.

The gate driver may include output stages, and each of the output stages may generate a gate signal in response to a voltage of a control node. Each of the output stages may include a hold transistor including a gate electrode connected to the control node, the hold transistor may be stressed according to use, and a threshold voltage of the hold transistor may be shifted. When the threshold voltage of the hold transistor is shifted, a reliability of the gate signal may be degraded, and a display quality of the display device may be reduced.

In some approaches, in order to prevent the threshold voltage of the hold transistor from being shifted, a number of the hold transistors may be at least 2 or more, and the gate electrodes of the hold transistors may be connected in parallel to the control node. Therefore, the stress applied to the hold transistors may be distributed. However, in this case, a number of transistors included in the each of the output stages may increase. Therefore, a dead space and a power consumption of the gate driver may increase.

SUMMARY

Embodiments supported by aspects of the present disclosure provide a gate driver for preventing a shift of a threshold voltage of a hold transistor.

Embodiments supported by aspects of the present disclosure provide a display device including the gate driver.

Embodiments supported by aspects of the present disclosure provide an electronic device including the display device.

In an embodiment of a gate driver according to the present disclosure, the gate driver includes a first output stage through a N-th output stage and a sensing stage. Each of the first output stage through the N-th output stage is configured to output a gate signal in response to a voltage of a control node. The sensing stage includes a hold transistor, which is turned on in response to the voltage of the control node, and is configured to sense a threshold voltage of the hold transistor of the sensing stage.

In an embodiment, the sensing stage may further include a sensing transistor connected to an electrode of the hold transistor of the sensing stage and configured to turn on in response to the voltage of the control node.

In an embodiment, the sensing transistor of the sensing stage may be turned on when the hold transistor of the sensing stage is turned on.

In an embodiment, a compensation voltage is applied to a back gate electrode of the hold transistor of the sensing stage based on the sensed threshold voltage of the hold transistor of the sensing stage.

In an embodiment, the each of the first output stage through the N-th output stage may include a hold transistor configured to turn on in response to the voltage of the control node, and when the compensation voltage is applied to the back gate electrode of the hold transistor of the sensing stage, the compensation voltage may be applied to a back gate electrode of each of the hold transistors of the first output stage through the N-th output stage.

In an embodiment, the sensing stage may be configured to sense the threshold voltage of the hold transistor of the sensing stage when a display device is turned on or turned off.

In an embodiment, the sensing stage may be configured to sense the threshold voltage of the hold transistor of the sensing stage when a display device is driven.

In an embodiment, the hold transistor of the sensing stage may be an N-channel metal-oxide-semiconductor (NMOS) transistor.

In an embodiment, the each of the first output stage through the N-th output stage may include a first transistor including a gate electrode configured to receive a first carry clock signal, a first electrode configured to receive an input signal, and a second electrode connected to a first control node, a second transistor including a gate electrode configured to receive a global control signal, a first electrode configured to receive a low gate voltage, and a second electrode connected to the first control node, a third transistor including a gate electrode connected to the first control node, a first electrode configured to receive a high gate voltage, and a second electrode connected to a middle node of the first transistor and a middle node of the second transistor, a fourth transistor including a gate electrode configured to receive a second carry clock signal, a first electrode connected to the first control node, and a second electrode, a fifth transistor including a gate electrode connected to a second control node, a first electrode connected to the second electrode of the fourth transistor, and a second electrode configured to generate a carry signal, a sixth transistor including a gate electrode connected to the first control node, a first electrode configured to receive the second carry clock signal, and a second electrode configured to generate the carry signal, a seventh transistor including a gate electrode connected to the second control node, a first electrode configured to receive a second low gate voltage, a second electrode generating the carry signal, and a back gate electrode configured to receive a second compensation voltage, an eighth transistor including a gate electrode connected to the first control node, a first electrode configured to receive a gate clock signal, and a second electrode configured to generate a gate signal, a ninth transistor including a gate electrode connected to the second control node, a first electrode configured to receive the low gate voltage, a second electrode configured to generate the gate signal, and a back gate electrode configured to receive a first compensation voltage, a tenth transistor including a gate electrode configured to receive the high gate voltage, a first electrode configured to receive the high gate voltage, and a second electrode, a eleventh transistor including a gate electrode connected to the second electrode of the tenth transistor, a first electrode configured to receive the high gate voltage, and a second electrode connected to the second control node, a twelfth transistor including a gate electrode connected to the first control node, a first electrode configured to receive the second low gate voltage, and a second electrode connected to the second control node, a thirteenth transistor including a gate electrode connected to the first control node, a first electrode configured to receive the low gate voltage, and a second electrode connected to the second electrode of the tenth transistor and the gate electrode of the eleventh transistor, a first capacitor including a first electrode connected to the first control node, and a second electrode connected to the second electrode of the fifth transistor, the second electrode of the sixth transistor, and the second electrode of the seventh transistor, and a second capacitor including a first electrode connected to the second control node, and a second electrode connected to the second electrode of the tenth transistor, the gate electrode of the eleventh transistor, and the second electrode of the thirteenth transistor.

In an embodiment, the sensing stage may include a first transistor including a gate electrode configured to receive a first carry clock signal, a first electrode configured to receive an N-th gate signal, and a second electrode connected to a first control node, a second electrode configured to receive a low gate voltage, and a second electrode connected to the first control node, a third transistor including a gate electrode connected to the first control node, a first electrode configured to receive a high gate voltage, and a second electrode connected to a middle node of the first transistor and a middle node of the second transistor, a fourth transistor including a gate electrode configured to receive a second carry clock signal, a first electrode connected to the first control node, and a second electrode, a fifth transistor including a gate electrode connected to a second control node, a first electrode connected to the second electrode of the fourth transistor, and a second electrode, a sixth transistor including a gate electrode connected to the first control node, a first electrode configured to receive the second carry clock signal, and a second electrode connected to the second electrode of the fifth transistor, a seventh transistor including a gate electrode connected to the second control node, a first electrode configured to receive a second low gate voltage, a second electrode connected to the second electrode of the fifth transistor and the second electrode of the sixth transistor, and a back gate electrode configured to receive a second compensation voltage, an eighth transistor including a gate electrode connected to the first control node, a first electrode configured to receive a gate clock signal, and a second electrode, a ninth transistor including a gate electrode connected to the second control node, a first electrode configured to receive the low gate voltage, a second electrode connected to the second electrode of the eighth transistor, and a back gate electrode configured to receive a first compensation voltage, a tenth transistor including a gate electrode configured to receive the high gate voltage, a first electrode configured to receive the high gate voltage, and a second electrode, a eleventh transistor including a gate electrode connected to the second electrode of the tenth transistor, a first electrode configured to receive the high gate voltage, and a second electrode connected to the second control node, a twelfth transistor including a gate electrode connected to the first control node, a first electrode configured to receive the second low gate voltage, and a second electrode connected to the second control node, a thirteenth transistor including a gate electrode connected to the first control node, a first electrode configured to receive the low gate voltage, and a second electrode connected to the second electrode of the tenth transistor and the gate electrode of the eleventh transistor, a first capacitor including a first electrode connected to the first control node and a second electrode connected to the second electrode of the fifth transistor, the second electrode of the sixth transistor, and the second electrode of the seventh transistor, a second capacitor including a first electrode connected to the second control node and a second electrode connected to the second electrode of the tenth transistor, the gate electrode of the eleventh transistor, and the second electrode of the thirteenth transistor, a first sensing transistor including a gate electrode configured to receive a voltage of the second control node, a first electrode connected to the second electrode of the eighth transistor and the second electrode of the ninth transistor, and a second electrode configured to generate a first sensing current, and a second sensing transistor including a gate electrode configured to receive the voltage of the second control node, a first electrode connected to the second electrode of the fifth transistor, the second electrode of the sixth transistor, and the second electrode of the seventh transistor, and a second electrode configured to generate a second sensing current.

In an embodiment of a display device according to the present disclosure, the display device includes a display panel including pixels, a gate driver configured to provide gate signals to the pixels, and a driving controller configured to control the gate driver. The gate driver includes a first output stage through a N-th output stage and a sensing stage. Each of the first output stage through the N-th output stage is configured to output a gate signal in response to a voltage of a control node. The sensing stage includes a hold transistor, which is configured to turn on in response to the voltage of the control node, and is configured to sense a threshold voltage of the hold transistor of the sensing stage.

In an embodiment, the sensing stage may further include a sensing transistor connected to an electrode of the hold transistor of the sensing stage and configured to turn on in response to the voltage of the control node.

In an embodiment, the sensing transistor of the sensing stage may be turned on when the hold transistor of the sensing stage is turned on.

In an embodiment, a compensation voltage is applied to a back gate electrode of the hold transistor of the sensing stage based on the sensed threshold voltage of the hold transistor of the sensing stage.

In an embodiment, the each of the first output stage through the N-th output stage may include a hold transistor configured to turn on in response to the voltage of the control node, and when the compensation voltage is applied to the back gate electrode of the hold transistor of the sensing stage, the compensation voltage may be applied to a back gate electrode of each of the hold transistors of the first output stage through the N-th output stage.

In an embodiment, the sensing stage is configured to sense the threshold voltage of the hold transistor of the sensing stage when the display device is turned on or turned off.

In an embodiment, the sensing stage is configured to sense the threshold voltage of the hold transistor of the sensing stage may be sensed when the display device is driven.

In an embodiment, the each of the first output stage through the N-th output stage may include a first transistor including a gate electrode configured to receive a first carry clock signal, a first electrode configured to receive an input signal, and a second electrode connected to a first control node, a second transistor including a gate electrode configured to receive a global control signal, a first electrode configured to receive a low gate voltage, and a second electrode connected to the first control node, a third transistor including a gate electrode connected to the first control node, a first electrode configured to receive a high gate voltage, and a second electrode connected to a middle node of the first transistor and a middle node of the second transistor, a fourth transistor including a gate electrode configured to receive a second carry clock signal, a first electrode connected to the first control node, and a second electrode, a fifth transistor including a gate electrode connected to a second control node, a first electrode connected to the second electrode of the fourth transistor, and a second electrode configured to generate a carry signal, a sixth transistor including a gate electrode connected to the first control node, a first electrode configured to receive the second carry clock signal, and a second electrode configured to generate the carry signal, a seventh transistor including a gate electrode connected to the second control node, a first electrode configured to receive a second low gate voltage, a second electrode configured to generate the carry signal, and a back gate electrode configured to receive a second compensation voltage, an eighth transistor including a gate electrode connected to the first control node, a first electrode configured to receive a gate clock signal, and a second electrode configured to generate a gate signal, a ninth transistor including a gate electrode connected to the second control node, a first electrode configured to receive the low gate voltage, a second electrode configured to generate the gate signal, and a back gate electrode configured to receive a first compensation voltage, a tenth transistor including a gate electrode configured to receive the high gate voltage, a first electrode configured to receive the high gate voltage, and a second electrode, a eleventh transistor including a gate electrode connected to the second electrode of the tenth transistor, a first electrode configured to receive the high gate voltage, and a second electrode connected to the second control node, a twelfth transistor including a gate electrode connected to the first control node, a first electrode configured to receive the second low gate voltage, and a second electrode connected to the second control node, a thirteenth transistor including a gate electrode connected to the first control node, a first electrode configured to receive the low gate voltage, and a second electrode connected to the second electrode of the tenth transistor and the gate electrode of the eleventh transistor, a first capacitor including a first electrode connected to the first control node, and a second electrode connected to the second electrode of the fifth transistor, the second electrode of the sixth transistor, and the second electrode of the seventh transistor, and a second capacitor including a first electrode connected to the second control node, and a second electrode connected to the second electrode of the tenth transistor, the gate electrode of the eleventh transistor, and the second electrode of the thirteenth transistor.

In an embodiment, the sensing stage may include a first transistor including a gate electrode configured to receive a first carry clock signal, a first electrode configured to receive an N-th gate signal, and a second electrode connected to a first control node, a second electrode configured to receive a low gate voltage, and a second electrode connected to the first control node, a third transistor including a gate electrode connected to the first control node, a first electrode configured to receive a high gate voltage, and a second electrode connected to a middle node of the first transistor and a middle node of the second transistor, a fourth transistor including a gate electrode configured to receive a second carry clock signal, a first electrode connected to the first control node, and a second electrode, a fifth transistor including a gate electrode connected to a second control node, a first electrode connected to the second electrode of the fourth transistor, and a second electrode, a sixth transistor including a gate electrode connected to the first control node, a first electrode configured to receive the second carry clock signal, and a second electrode connected to the second electrode of the fifth transistor, a seventh transistor including a gate electrode connected to the second control node, a first electrode configured to receive a second low gate voltage, a second electrode connected to the second electrode of the fifth transistor and the second electrode of the sixth transistor, and a back gate electrode configured to receive a second compensation voltage, an eighth transistor including a gate electrode connected to the first control node, a first electrode configured to receive a gate clock signal, and a second electrode, a ninth transistor including a gate electrode connected to the second control node, a first electrode configured to receive the low gate voltage, a second electrode connected to the second electrode of the eighth transistor, and a back gate electrode configured to receive a first compensation voltage, a tenth transistor including a gate electrode configured to receive the high gate voltage, a first electrode configured to receive the high gate voltage, and a second electrode, a eleventh transistor including a gate electrode connected to the second electrode of the tenth transistor, a first electrode configured to receive the high gate voltage, and a second electrode connected to the second control node, a twelfth transistor including a gate electrode connected to the first control node, a first electrode configured to receive the second low gate voltage, and a second electrode connected to the second control node, a thirteenth transistor including a gate electrode connected to the first control node, a first electrode configured to receive the low gate voltage, and a second electrode connected to the second electrode of the tenth transistor and the gate electrode of the eleventh transistor, a first capacitor including a first electrode connected to the first control node and a second electrode connected to the second electrode of the fifth transistor, the second electrode of the sixth transistor, and the second electrode of the seventh transistor, a second capacitor including a first electrode connected to the second control node and a second electrode connected to the second electrode of the tenth transistor, the gate electrode of the eleventh transistor, and the second electrode of the thirteenth transistor, a first sensing transistor including a gate electrode configured to receive a voltage of the second control node, a first electrode connected to the second electrode of the eighth transistor and the second electrode of the ninth transistor, and a second electrode configured to generate a first sensing current, and a second sensing transistor including a gate electrode configured to receive the voltage of the second control node, a first electrode connected to the second electrode of the fifth transistor, the second electrode of the sixth transistor, and the second electrode of the seventh transistor, and a second electrode configured to generate a second sensing current.

In an embodiment of an electronic device according to the present disclosure, the electronic device includes a display panel including pixels, a gate driver configured to provide gate signals to the pixels, a driving controller configured to control the gate driver, and a processor configured to control the driving controller. The gate driver includes a first output stage through a N-th output stage and a sensing stage. Each of the first output stage through the N-th output stage is configured to output a gate signal in response to a voltage of a control node. The sensing stage includes a hold transistor, which is turned on in response to the voltage of the control node, and is configured to sense a threshold voltage of the hold transistor of the sensing stage.

According to the gate driver, the display device including the gate driver, and the electronic device including the display device, a threshold voltage shift of hold transistors having a long turn-on time in response to a voltage of a control node is sensed and a compensation voltage is applied to a back gate electrode of each of the hold transistors, a threshold voltage of the each of the hold transistors may be compensated, and a reliability of the gate signal may be improved.

BRIEF DESCRIPTION OF THE DRAWINGS

The above and other features of embodiments of the present disclosure will become more apparent by describing in detailed embodiments thereof with reference to the accompanying drawings, in which.

DETAILED DESCRIPTION

Figure 1:
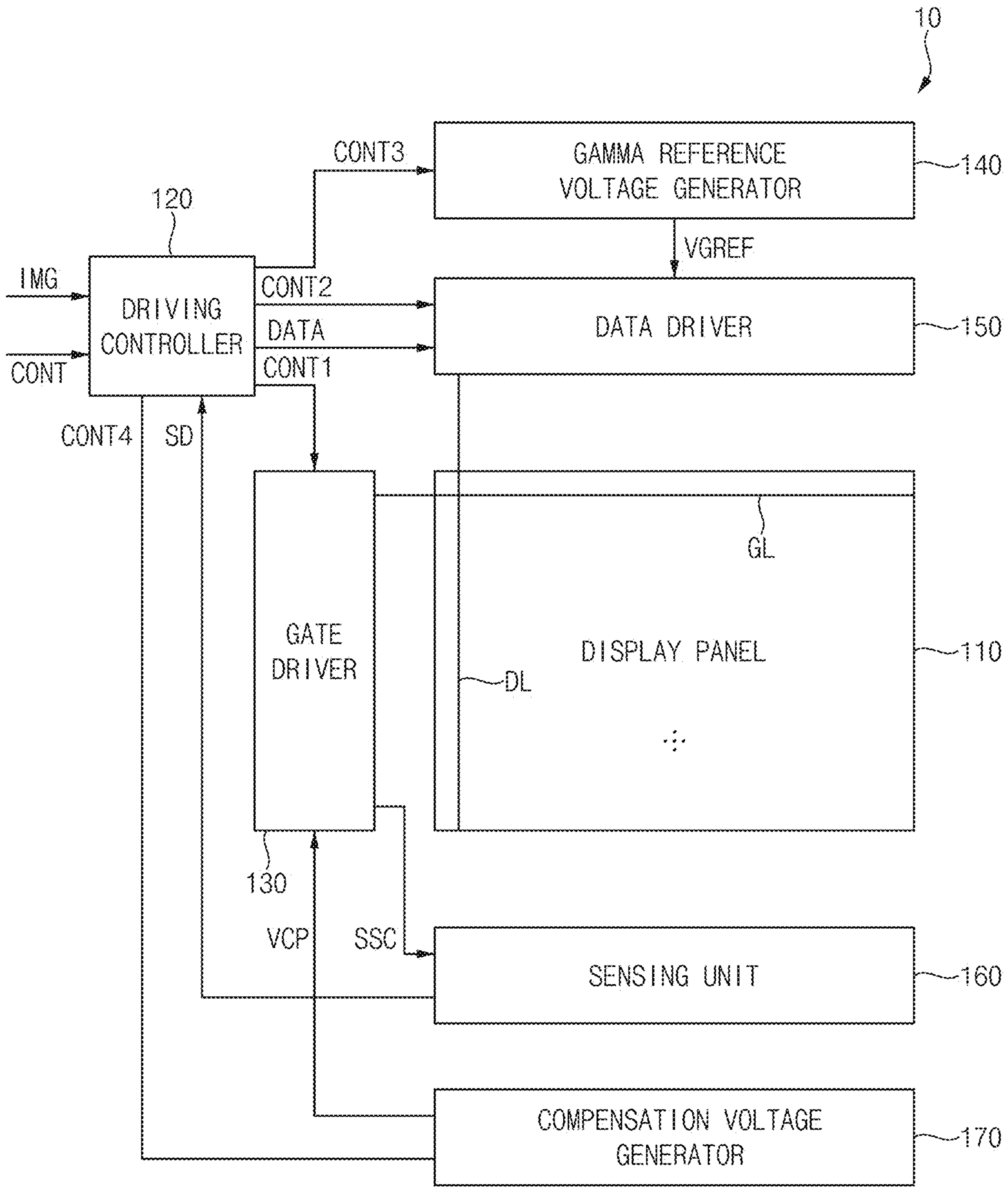
FIG. 1 is a block diagram illustrating a display device according to embodiments of the present disclosure.

Embodiments supported by the present disclosure will now be described more fully hereinafter with reference to the accompanying drawings, in which one or more example embodiments are illustrated. Aspects supported by the present disclosure may, however, be embodied in different forms and should not be construed as limited to the embodiments set forth herein. Rather, these example embodiments are provided so that this disclosure will be thorough and complete, and will fully convey the scope of example aspects of the invention to those skilled in the art.

Terms such as, for example, first, second, and the like may be used to describe various components, but the components should not be limited by the terms. The terms as used herein may distinguish one component from other components and are not to be limited by the terms. For example, without departing the scope of the present disclosure, a first component may be referred to as a second component, and similarly, the second component may also be referred to as the first component. The terms of a singular form may include plural forms unless otherwise specified.

The terminology used herein is for the purpose of describing particular embodiments and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The terms "about" or "approximately" as used herein are inclusive of the stated value and include a suitable range of deviation for the particular value as determined by one of ordinary skill in the art, considering the measurement in question and the error associated with measurement of the particular quantity. The term "about" can mean within one or more standard deviations, or within +30%, 20%, 10%, 5% of the stated value, for example.

The term "substantially," as used herein, means approximately or actually. The term "substantially equal" means approximately or actually equal. The term "substantially the same" means approximately or actually the same. The term "substantially identical" means approximately or actually identical. The term "substantially perpendicular" means approximately or actually perpendicular.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Embodiments are described herein with reference to cross section illustrations that are schematic illustrations of example embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases.

It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

FIG. 1 is a block diagram illustrating a display device 10 according to embodiments of the present disclosure.

Referring to FIG. 1, a display device 10 may include a display panel 110 and a display panel driver. The display panel driver may include a driving controller 120, a gate driver 130, a gamma reference voltage generator 140, and a data driver 150. The display device 10 may further include a sensing unit 160 and a compensation voltage generator 170.

The display panel 110 may include a display area for displaying an image and a peripheral area arranged adjacent to the display area.

The display panel 110 may include gate lines GL, data lines DL, and pixels electrically connected to the gate lines GL and the data lines DL, respectively. The gate lines GL may extend in a first direction, and the data lines DL may extend in a second direction crossing the first direction.

The driving controller 120 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 120 may generate a first control signal CONT1, a second control signal CONT2, a third control signal CONT3, a fourth control signal CONT4, and a data signal DATA based on the input image data IMG and the input control signal CONT.

The driving controller 120 may generate the first control signal CONT1 for controlling an operation of the gate driver 130 based on the input control signal CONT, and output the first control signal CONT1 to the gate driver 130. The first control signal CONT1 may include a vertical start signal and a gate clock signal.

The driving controller 120 may generate the second control signal CONT2 for controlling an operation of the data driver 150 based on the input control signal CONT, and output the second control signal CONT2 to the data driver 150. The second control signal CONT2 may include a horizontal start signal and a load signal.

The driving controller 120 may generate the data signal DATA based on the input image data IMG. The driving controller 120 may output the data signal DATA to the data driver 150.

The driving controller 120 may generate the third control signal CONT3 for controlling an operation of the gamma reference voltage generator 140 based on the input control signal CONT, and output the third control signal CONT3 to the gamma reference voltage generator 140.

The driving controller 120 may generate the fourth control signal CONT4 for controlling an operation of the compensation voltage generator 170 based on the input control signal CONT, and output the fourth control signal CONT4 to the compensation voltage generator 170.

The gate driver 130 may generate gate signals for driving the gate lines GL in response to the first control signal CONT1 received from the driving controller 120. The gate driver 130 may output the gate signals to the gate lines GL.

In an embodiment, the gate driver 130 may be integrated on the peripheral area of the display panel 110.

The gamma reference voltage generator 140 may generate a gamma reference voltage VGREF in response to the third control signal CONT3 received from the driving controller 120. The gamma reference voltage generator 140 may provide the gamma reference voltage VGREF to the data driver 150. The gamma reference voltage VGREF may have a value corresponding to each data signal DATA.

For example, the gamma reference voltage generator 140 may be arranged in the driving controller 120 or may be arranged in the data driver 150.

The data driver 150 may receive the second control signal CONT2 and the data signal DATA from the driving controller 120, and receive the gamma reference voltage VGREF from the gamma reference voltage generator 140. The data driver 150 may convert the data signal DATA into a data voltage having an analog type using the gamma reference voltage VGREF. The data driver 150 may output the data voltage to the data line DL.

The sensing unit 160 may receive a sensing current SSC from the gate driver 130, generate sensing data SD based on the sensing current SSC, and output the sensing data SD to the driving controller 120.

The driving controller 120 may generate a compensation signal based on the sensing data SD and output the compensation signal to the compensation voltage generator 170.

The compensation voltage generator 170 may generate a compensation voltage VCP based on the compensation signal and output the compensation voltage VCP to the gate driver 130.

Figure 2:
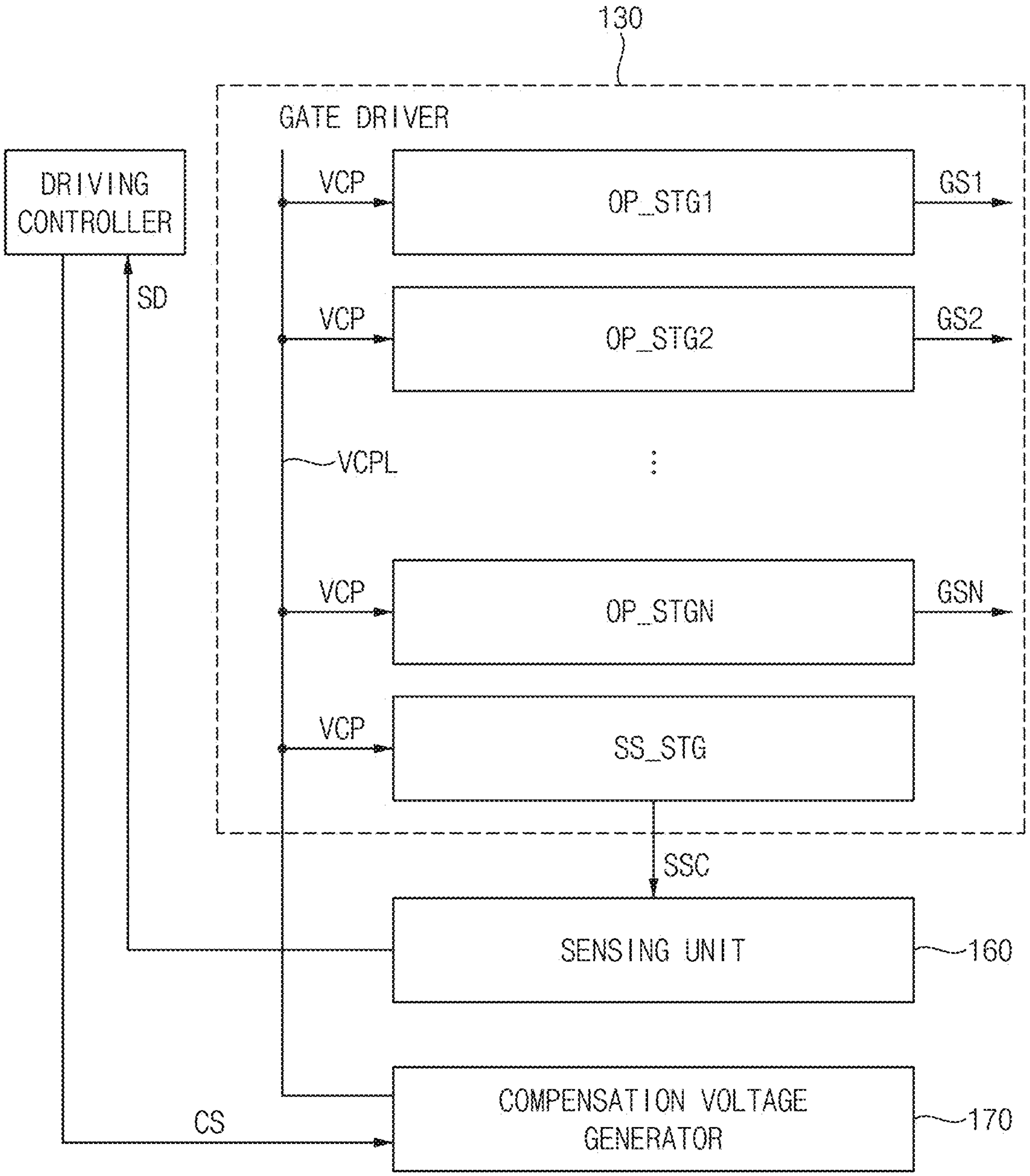
FIG. 2 is a block diagram illustrating a gate driver of FIG. 1.

FIG. 2 is a block diagram illustrating a gate driver 130 of FIG. 1.

Referring to FIG. 2, a gate driver 130 may include a first output stage OP_STG1 through a N-th output stage OP_STGN (e.g., first output stage OP_STG1, second output stage OP_STG2, . . . , N-th output stage OP_STGN) and a sensing stage SS_STG.

Each of the first output stage OP_STG1 through the N-th output stage OP_STG1N (e.g., first output stage OP_STG1, second output stage OP_STG2, . . . , N-th output stage OP_STGN) may generate a respective gate signal (e.g., gate signal GS1, gate signal GS2, . . . , gate signal GSN) in response to a voltage of a control node.

The each of the first output stage OP_STG1 through the N-th output stage OP_STG1N (e.g., first output stage OP_STG1, second output stage OP_STG2, . . . , N-th output stage OP_STGN) may include a hold transistor turned on in response to the voltage of the control node, each of the hold transistors of the first output stage OP_STG1 through the N-th output stage OP_STG1N (e.g., first output stage OP_STG1, second output stage OP_STG2, . . . , N-th output stage OP_STGN) may be stressed according to use, and a threshold voltage of each of the hold transistors of the first output stage OP_STG1 through the N-th output stage OP_STG1N (e.g., first output stage OP_STG1, second output stage OP_STG2, . . . , N-th output stage OP_STGN) may be shifted. When the threshold voltage of each of the hold transistors of the first output stage OP_STG1 through the N-th output stage OP_STG1N (e.g., first output stage OP_STG1, second output stage OP_STG2, . . . , N-th output stage OP_STGN) is shifted, a reliability of the respective gate signals (e.g., gate signal GS1, gate signal GS2, . . . , gate signal GSN) may be degraded, and a display quality of the display device 10 may be reduced.

The sensing stage SS_STG may have a configuration identical to or similar to the each of the first output stage OP_STG1 through the N-th output stage OP_STG1N (e.g., first output stage OP_STG1, second output stage OP_STG2, . . . , N-th output stage OP_STGN). The sensing stage SS_STG may include a hold transistor turned on in response to the voltage of the control node. When the hold transistors of the first output stage OP_STG1 through the N-th output stage OP_STG1N (e.g., first output stage OP_STG1, second output stage OP_STG2, . . . , N-th output stage OP_STGN) are turned on, the hold transistor of the sensing stage SS_STG may also be turned on. Therefore, a stress value applied to each of the hold transistors of the first output stage OP_STG1 through the N-th output stage OP_STG1N (e.g., first output stage OP_STG1, second output stage OP_STG2, . . . , N-th output stage OP_STGN) may be substantially equal to a stress value applied to the hold transistor of the sensing stage SS_STG. The sensing stage SS_STG may further include a sensing transistor connected to an electrode of the hold transistor of the sensing stage SS_STG and turned on in response to the voltage of the control node. When the sensing transistor is turned on, a sensing current SSC may be output from the sensing stage SS_STG.

The sensing unit 160 may generate sensing data SD based on the sensing current SSC and output the sensing data SD to the driving controller 120. The sensing data SD may include an information about the threshold voltage of the hold transistor of the sensing stage SS_STG. For example, the sensing data SD may include a threshold voltage shift value of the hold transistor of the sensing stage SS_STG.

The driving controller 120 may generate a compensation signal CS based on the threshold voltage shift value of the hold transistor of the sensing stage SS_STG and output the compensation signal CS to a compensation voltage generator 170.

The compensation voltage generator 170 may generate a compensation voltage VCP based on the compensation signal CS and provide the compensation voltage VCP to the first output stage OP_STG1 through the N-th output stage OP_STG1N (e.g., first output stage OP_STG1, second output stage OP_STG2, . . . , N-th output stage OP_STGN) and the sensing stage SS_STG. Specifically, the compensation voltage VCP may be applied to a back gate electrode of each of the hold transistors of the first output stage OP_STG1 through the N-th output stage OP_STG1N (e.g., first output stage OP_STG1, second output stage OP_STG2, . . . , N-th output stage OP_STGN) and the back gate electrode of the hold transistor of the sensing stage SS_STG. Therefore, the threshold voltage of each of the hold transistors of the first output stage OP_STG1 through the N-th output stage OP_STG1N (e.g., first output stage OP_STG1, second output stage OP_STG2, . . . , N-th output stage OP_STGN) and the threshold voltage of the hold transistor of the sensing stage SS_STG may be compensated.

Embodiments of the present disclosure are not limited thereto. For example, the compensation voltage generator 170 may generate multiple compensation voltages (e.g., first compensation voltage VCP1 and second compensation voltage VCP2 described herein, and the like) based on the compensation signal and output any quantity of the compensation voltages to the gate driver 130 in association with the operation of the display device 10.

When a display device 10 is turned on or turned off, the threshold voltage of each of the hold transistors of the first output stage OP_STG1 through the N-th output stage OP_STG1N (e.g., first output stage OP_STG1, second output stage OP_STG2, . . . , N-th output stage OP_STGN) and the threshold voltage of the hold transistor of the sensing stage SS_STG may be sensed. Or, when the display device 10 is driven, the threshold voltage of each of the hold transistors of the first output stage OP_STG1 through the N-th output stage OP_STG1N (e.g., first output stage OP_STG1, second output stage OP_STG2, . . . , N-th output stage OP_STGN) and the threshold voltage of the hold transistor of the sensing stage SS_STG may be sensed.

Figure 3:
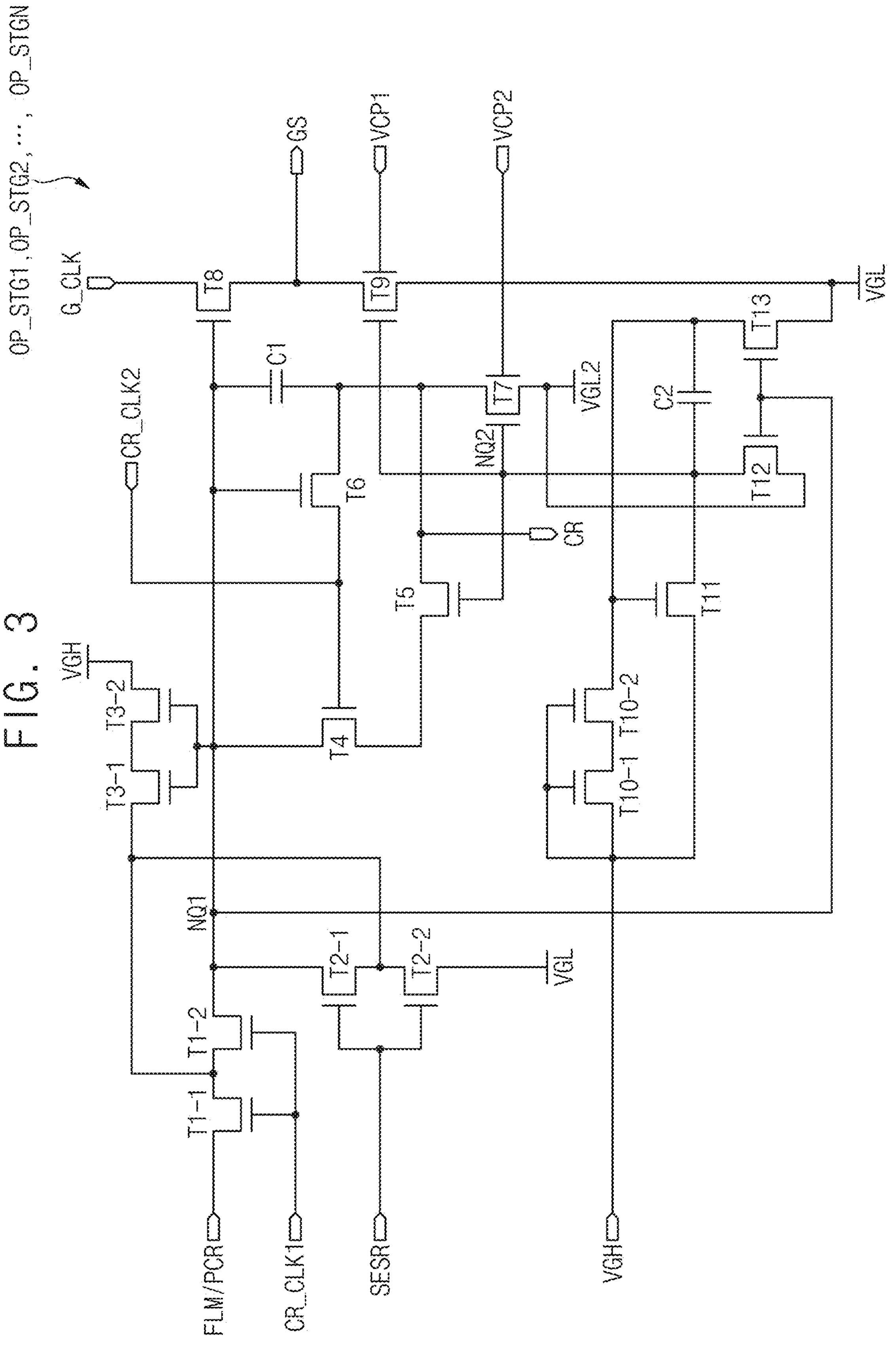
FIG. 3 is a circuit diagram illustrating output stages of FIG. 2.

FIG. 3 is a circuit diagram illustrating output stages OP_STG1, OP_STG2, . . . , OP_STGN of FIG. 2.

Referring to FIG. 3, output stages OP_STG1, OP_STG2, . . . , OP_STGN may include a first transistor T1-1, T1-2, a second transistor T2-1, T2-2, a third transistor T3-1, T3-2, a fourth transistor T4, a fifth transistor T5, a sixth transistor T6, a seventh transistor T7, an eighth transistor T8, a ninth transistor T9, a tenth transistor T10-1, T10-2, an eleventh transistor T11, a twelfth transistor T12, a thirteenth transistor T13, a first capacitor C1, and a second capacitor C2. The first transistor T1-1, T1-2, the second transistor T2-1, T2-2, the third transistor T3-1, T3-2, the fourth transistor T4, the fifth transistor T5, the sixth transistor T6, the seventh transistor T7, the eighth transistor T8, the ninth transistor T9, the tenth transistor T10-1, T10-2, the eleventh transistor T11, the twelfth transistor T12, and the thirteenth transistor T13 may be NMOS transistors.

The first transistor T1-1, T1-2 may include a first-first transistor T1-1 and a first-second transistor T1-2. The first-first transistor T1-1 may include a gate electrode receiving a first carry clock signal CR_CLK1, a first electrode receiving an input signal FLM/PCR, and a second electrode. The first-second transistor T1-2 may include a gate electrode connected to the first carry clock signal CR_CLK1, a first electrode connected to the second electrode of the first-first transistor T1-1, and a second electrode connected to a first control node NQ1. The second electrode of the first-first transistor T1-1 and the first electrode of the first-second transistor T1-2 may be a middle node of the first transistor T1-1, T1-2. The input signal FLM/PCR may be a gate start signal FLM or a carry signal of a previous stage.

The second transistors T2-1, T2-2 may include a second-first transistor T2-1 and a second-second transistor T2-2. The second-first transistor T2-1 may include a gate electrode receiving a global control signal SESR, a first electrode connected to the middle node of the first transistor T1-1, T1-2, and a second electrode connected to the first control node NQ1. The second-second transistor T2-2 may include a gate electrode receiving the global control signal SESR, a first electrode receiving a low gate signal VGL, and a second electrode connected to the middle node of the first transistor T1-1, T1-2. The second electrode of the second-first transistor T2-1 and the second electrode of the second-second transistor T2-2 may be a middle node of the second transistor T2-1, T2-2.

The terms "low gate signal VGL," "second low gate signal VGL2," and the like may refer to a relatively negative supply voltage such as, for example, a supply voltage VSS. The term "low gate signal" may also be referred to herein as "low gate voltage." The term "high gate voltage VGH," and the like may refer to a relatively positive supply voltage such as, for example, a supply voltage VDD.

The third transistor T3-1, T3-2 may include a third-first transistor T3-1 and a third-second transistor T3-2. The third-first transistor T3-1 may include a gate electrode connected to the first control node NQ1, a first electrode, and a second electrode connected to the middle node of the first transistor T1-1, T1-2 and the middle node of the second transistor T2-1, T2-2. The third-second transistor T3-2 may include a gate electrode connected to the first control node NQ1, a first electrode receiving a high gate voltage VGH, and a second electrode connected to the first electrode of the third-first transistor T3-1.

The fourth transistor T4 may include a gate electrode receiving a second carry clock signal CR_CLK2, a first electrode connected to the first control node NQ1, and a second electrode.

The fifth transistor T5 may include a gate electrode connected to a second control node NQ2, a first electrode connected to the second electrode of the fourth transistor T4, and a second electrode generating a carry signal CR.

The sixth transistor T6 may include a gate electrode connected to the first control node NQ1, a first electrode receiving the second carry clock signal CR_CLK2, and a second electrode generating the carry signal CR.

The seventh transistor T7 may include a gate electrode connected to the second control node NQ2, a first electrode receiving a second low gate voltage VGL2, and a second electrode generating the carry signal CR. The seventh transistor T7 may further include a back gate electrode receiving a second compensation voltage VCP2.

The eighth transistor T8 may include a gate electrode connected to the first control node NQ1, a first electrode receiving a gate clock signal G_CLK, and a second electrode generating a gate signal GS.

The ninth transistor T9 may include a gate electrode connected to the second control node NQ2, a first electrode receiving the low gate voltage VGL, and a second electrode generating the gate signal GS. The ninth transistor T9 may further include a back gate electrode receiving a first compensation voltage VCP1.

The tenth transistors T10-1, T10-2 may include a tenth-first transistor T10-1 and a tenth-second transistor T10-2. The tenth-first transistor T10-1 may include a gate electrode receiving the high gate voltage VGH, a first electrode receiving the high gate voltage VGH, and a second electrode. The tenth-second transistor T10-2 may include a gate electrode receiving the high gate voltage VGH, a first electrode connected to the second electrode of the 10-1 transistor T10-1, and a second electrode.

The eleventh transistor T11 may include a gate electrode connected to the second electrode of the tenth-second transistor T10-2, a first electrode receiving the high gate voltage VGH, and a second electrode connected to the second control node NQ2.

The twelfth transistor T12 may include a gate electrode connected to the first control node NQ1, a first electrode connected to the second low gate voltage VGL2, and a second electrode connected to the second control node NQ2.

The thirteenth transistor T13 may include a gate electrode connected to the first control node NQ1, a first electrode receiving the low gate voltage VGL, and a second electrode connected to the second electrode of the tenth-second transistor T10-2 and the gate electrode of the eleventh transistor T11.

The first capacitor C1 may include a first electrode connected to the first control node NQ1 and a second electrode connected to the second electrode of the fifth transistor T5, the second electrode of the sixth transistor T6, and the second electrode of the seventh transistor T7.

The second capacitor C2 may include a first electrode connected to the second control node NQ2 and a second electrode connected to the gate electrode of the tenth-second transistor T10-2, the eleventh transistor T11, and the second electrode of the thirteenth transistor T13.

Here, seventh transistor T7 and ninth transistor T9, each including a gate electrode connected to the second control node NQ2, may be hold transistors.

The output stage OP_STG1, OP_STG2, . . . , OP_STGN may generate the gate signal GS in response to a voltage of the first control node NQ1 and a voltage of the second control node NQ2. For example, the voltage of the second control node NQ2 of the output stage OP_STG1, OP_STG2, . . . , OP_STGN may have a high level for a long time (e.g., for a duration exceeding a threshold duration), and the ninth transistor T9 and the seventh transistor T7 may have a long turn-on time (e.g., a turn-on time exceeding a threshold turn-on time). Therefore, the ninth transistor T9 and the seventh transistor T7 may be stressed according to on use, and a threshold voltage of each of the ninth transistor T9 and the seventh transistor T7 may be shifted.

Figure 4:
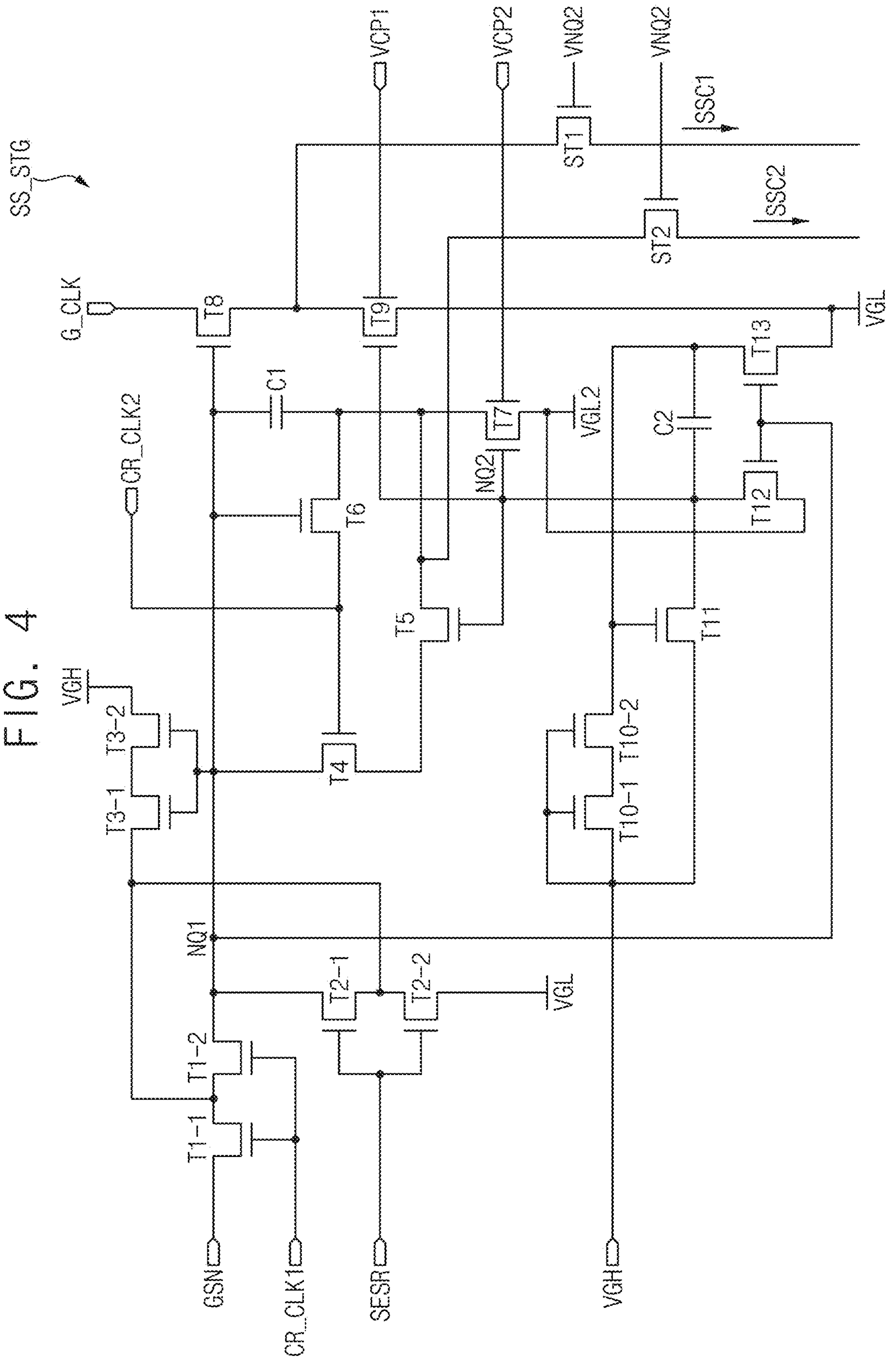
FIG. 4 is a circuit diagram illustrating a sensing stage of FIG. 2.

FIG. 4 is a circuit diagram illustrating a sensing stage SS_STG of FIG. 2.

Referring to FIG. 4, a sensing stage SS_STG may include a first transistor T1-1, T1-2, a second transistor T2-1, T2-2, a third transistor T3-1, T3-2, a fourth transistor T4, a fifth transistor T5, a sixth transistor T6, a seventh transistor T7, an eighth transistor T8, a ninth transistor T9, a tenth transistor T10-1, T10-2, an eleventh transistor T11, a twelfth transistor T12, a thirteenth transistor T13, a first capacitor C1, and a second capacitor C2. The sensing stage SS_STG may further include a first sensing transistor ST1 and a second sensing transistor ST2. The first transistor T1-1, T1-2, the second transistor T2-1, T2-2, the third transistor T3-1, T3-2, the fourth transistor T4, the fifth transistor T5, the sixth transistor T6, the seventh transistor T7, the eighth transistor T8, the ninth transistor T9, the tenth transistor T10-1, T10-2, the eleventh transistor T11, the twelfth transistor T12, the thirteenth transistor T13, the first sensing transistor ST1, and the second sensing transistor ST2 may be NMOS transistors.

The first transistor T1-1, T1-2 may include a first-first transistor T1-1 and a first-second transistor T1-2. The first-first transistor T1-1 may include a gate electrode receiving a first carry clock signal CR_CLK1, a first electrode receiving an N-th gate signal GSN, and a second electrode. The first-second transistor T1-2 may include a gate electrode connected to the first carry clock signal CR_CLK1, a first electrode connected to the second electrode of the first-first transistor T1-1, and a second electrode connected to a first control node NQ1. The second electrode of the first-first transistor T1-1 and the first electrode of the first-second transistor T1-2 may be a middle node of the first transistor T1-1, T1-2.

The second transistors T2-1, T2-2 may include a second-first transistor T2-1 and a second-second transistor T2-2. The 2-1 transistor T2-1 may include a gate electrode receiving a global control signal SESR, a first electrode connected to the middle node of the first transistor T1-1, T1-2, and a second electrode connected to the first control node NQ1.

The second-second transistor T2-2 may include a gate electrode receiving the global control signal SESR, a first electrode receiving a low gate signal VGL, and a second electrode connected to the middle node of the first transistor T1-1, T1-2. The second electrode of the second-first transistor T2-1 and the second electrode of the second-second transistor T2-2 may be a middle node of the second transistor T2-1, T2-2.

The third transistor T3-1, T3-2 may include a third-first transistor T3-1 and a third-second transistor T3-2. The third-first transistor T3-1 may include a gate electrode connected to the first control node NQ1, a first electrode, and a second electrode connected to the middle node of the first transistor T1-1, T1-2 and the middle node of the second transistor T2-1, T2-2. The third-second transistor T3-2 may include a gate electrode connected to the first control node NQ1, a first electrode receiving a high gate voltage VGH, and a second electrode connected to the first electrode of the third-first transistor T3-1.

The fourth transistor T4 may include a gate electrode receiving a second carry clock signal CR_CLK2, a first electrode connected to the first control node NQ1, and a second electrode.

The fifth transistor T5 may include a gate electrode connected to the second control node NQ2, a first electrode connected to the second electrode of the fourth transistor T4, and a second electrode.

The sixth transistor T6 may include a gate electrode connected to the first control node NQ1, a first electrode receiving the second carry clock signal CR_CLK2, and a second electrode connected to the second electrode of the fifth transistor T5.

The seventh transistor T7 may include a gate electrode connected to the second control node NQ2, a first electrode receiving a second low gate voltage VGL2, and a second electrode connected to the second electrode of the fifth transistor T5 and the second electrode of the sixth transistor T6. The seventh transistor T7 may further include a back gate electrode receiving a second compensation voltage VCP2.

The eighth transistor T8 may include a gate electrode connected to the first control node NQ1, a first electrode receiving a gate clock signal G_CLK, and a second electrode generating a gate signal GS.

The ninth transistor T9 may include a gate electrode connected to the second control node NQ2, a first electrode receiving the low gate voltage VGL, and a second electrode generating the gate signal GS. The ninth transistor T9 may further include a back gate electrode receiving a first compensation voltage VCP1.

The tenth transistors T10-1, T10-2 may include a tenth-first transistor T10-1 and a tenth-second transistor T10-2. The tenth-first transistor T10-1 may include a gate electrode receiving the high gate voltage VGH, a first electrode receiving the high gate voltage VGH, and a second electrode. The tenth-second transistor T10-2 may include a gate electrode receiving the high gate voltage VGH, a first electrode connected to the second electrode of the tenth-first transistor T10-1, and a second electrode.

The eleventh transistor T11 may include a gate electrode connected to the second electrode of the tenth-second transistor T10-2, a first electrode receiving the high gate voltage VGH, and a second electrode connected to the second control node NQ2.

The twelfth transistor T12 may include a gate electrode connected to the first control node NQ1, a first electrode connected to the second low gate voltage VGL2, and a second electrode connected to the second control node NQ2.

The thirteenth transistor T13 may include a gate electrode connected to the first control node NQ1, a first electrode receiving the low gate voltage VGL, and a second electrode connected to the second electrode of the tenth-second transistor T10-2 and the gate electrode of the eleventh transistor T11.

The first capacitor C1 may include a first electrode connected to the first control node NQ1 and a second electrode connected to the second electrode of the fifth transistor T5, the second electrode of the sixth transistor T6, and the second electrode of the seventh transistor T7.

The second capacitor C2 may include a first electrode connected to the second control node NQ2 and a second electrode connected to the gate electrode of the 10-2 transistor T10-2, the second electrode of the eleventh transistor T11, and the second electrode of the thirteenth transistor T13.

The first sensing transistor ST1 may include a gate electrode receiving a voltage VNQ2 of the second control node NQ2, a first electrode connected to the second electrode of the eighth transistor T8 and the first electrode of the ninth transistor T9, and a second electrode generating a first sensing current SSC1.

The second sensing transistor ST2 may include a gate electrode receiving the voltage VNQ2 of the second control node NQ2, a first electrode connected to the second electrode of the fifth transistor T5, the second electrode of the sixth transistor T6, and the first electrode of the seventh transistor T7, and a second electrode generating a second sensing current SSC2.

Here, the seventh transistor T7 and the ninth transistor T9, each including a gate electrode connected to the second control node NQ2 may be hold transistors.

The sensing stage SS_STG may have a configuration identical to or similar to the each of the output stages OP_STG1, OP_STG2, . . . , OP_STGN. For example, the ninth transistor T9 and the seventh transistor T7 of the sensing stage SS_STG may be identical to or similar to the ninth transistor T9 and the seventh transistor T7 of the output stages OP_STG1, OP_STG2, . . . , OP_STGN. When the ninth transistor T9 and the seventh transistor T7 of the output stages OP_STG1, OP_STG2, . . . , OP_STGN are turned on, the ninth transistor T9 and the seventh transistor T7 of the sensing stage SS_STG may be turned on together. Therefore, stress values applied to the ninth transistor T9 and the seventh transistor T7 of the output stages OP_STG1, OP_STG2, . . . , OP_STGN may be substantially equal to stress values applied to the ninth transistor T9 and the seventh transistor T7 of the sensing stage SS_STG.

When the ninth transistor T9 of the sensing stage SS_STG is turned on, the first sensing transistor ST1 may be turned on. When the first sensing transistor ST1 is turned on, the first sensing current SSC1 may be output from the sensing stage SS_STG. The sensing data SD generated based on the first sensing current SSC1 may include a threshold voltage shift value of the ninth transistor T9 of the output stage OP_STG1, OP_STG2, . . . , OP_STGN and a threshold voltage shift value of the ninth transistor T9 of the sensing stage SS_STG. The first compensation voltage VCP1 may be generated based on the sensing data SD generated based on the first sensing current SSC1.

When the seventh transistor T7 of the sensing stage SS_STG is turned on, the second sensing transistor ST2 may be turned on. When the first sensing transistor ST1 is turned on, the second sensing current SSC2 may be output from the sensing stage SS_STG. The sensing data SD generated based on the second sensing current SSC2 may include a threshold voltage shift value of the seventh transistor 79 of the output stages OP_STG1, OP_STG2, . . . , OP_STGN and a threshold voltage shift value of the seventh transistor T7 of the sensing stage SS_STG. The second compensation voltage VCP2 may be generated based on the sensing data SD generated based on the second sensing current SSC2. The first compensation voltage VCP1 corresponding to the first sensing current SSC1 and the second compensation voltage VCP2 corresponding to the second sensing current SSC2 may be stored in a lookup table. Alternatively, the first compensation voltage VCP1 corresponding to the first sensing current SSC1 and the second compensation voltage VCP2 corresponding to the second sensing current SSC2 may be calculated and generated.

As such, the threshold voltage shift of the seventh transistor T7 and the ninth transistor T9 (i.e., the hold transistors) having a long turn-on time in response to a voltage of the control node NQ1, NQ2 is sensed and a compensation voltage is applied to a back gate electrode of each of the seventh transistor T7 and the ninth transistor T9 (i.e., the hold transistors), a threshold voltage of the each of the seventh transistor T7 and the ninth transistor T9 (i.e., the hold transistors) may be compensated, and a reliability of the gate signal GS may be improved.

Figure 5:
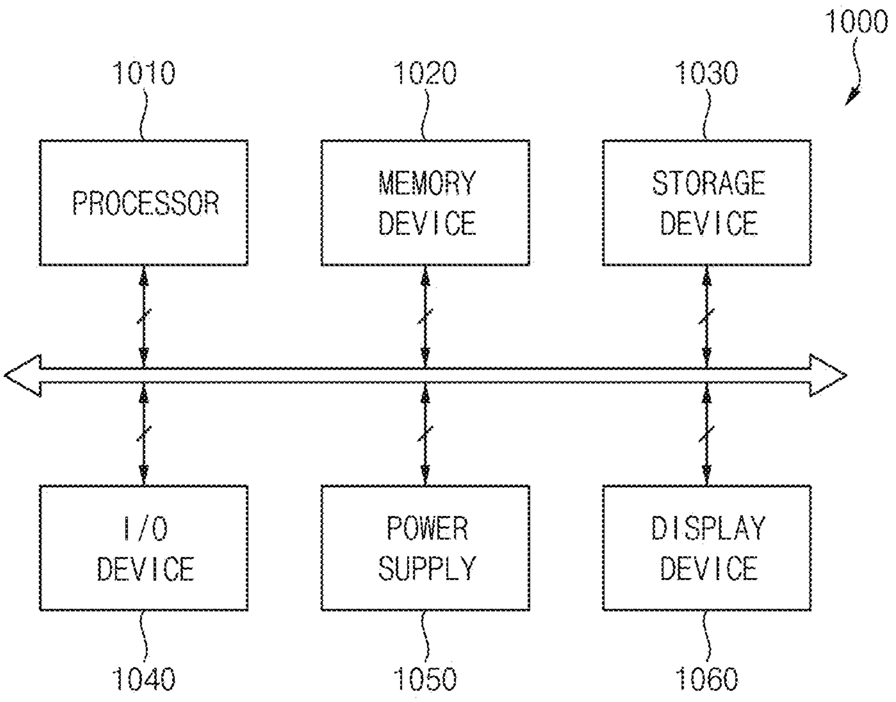
FIG. 5 is a block diagram illustrating an electronic device.
Figure 6:
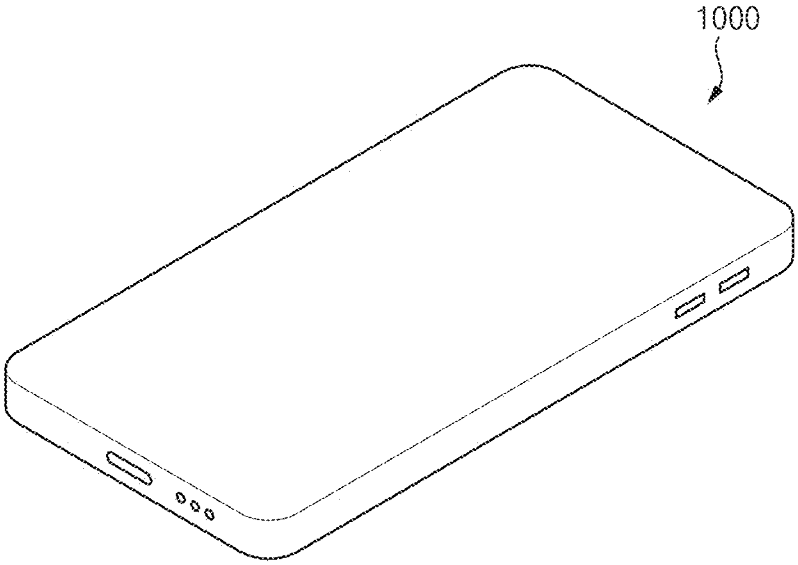
FIG. 6 is a diagram illustrating an embodiment in which an electronic device of FIG. 5 is implemented as a smart phone.

FIG. 5 is a block diagram illustrating an electronic device 1000. FIG. 6 is a diagram illustrating an embodiment in which an electronic device 1000 of FIG. 5 is implemented as a smart phone.

Referring to FIGS. 5 and 6, an electronic device 1000 may include a processor 1010, a memory device 1020, a storage device 1030, an input/output I/O device 1040, a power supply 1050, and a display device 1060. The display device 1060 may be the display device 10 of FIG. 1. In some aspects, the electronic device 1000 may further include a plurality of ports for communicating with a video card, a sound card, a memory card, a universal serial bus USB device, other electronic device, and the like.

In an embodiment, as illustrated in FIG. 6, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HMD device, and the like.

The processor 1010 may perform various computing functions. The processor 1010 may be a microprocessor, a central processing unit CPU, an application processor AP, and the like. The processor 1010 may be coupled to other components via an address bus, a control bus, a data bus, and the like. Further, the processor 1010 may be coupled to an extended bus such as, for example, a peripheral component interconnection PCI bus.

The memory device 1020 may store data for operations of the electronic device 1000. For example, the memory device 1020 may include at least one nonvolatile memory device such as, for example, an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device such as, for example, a dynamic random access memory DRAM device, a static random access memory SRAM device, a mobile DRAM device, and the like.

The storage device 1030 may include a solid state drive SSD device, a hard disk drive HDD device, a CD-ROM device, and the like.

The I/O device 1040 may include an input device such as, for example, a keyboard, a keypad, a mouse device, a touch-pad, a touch-screen, and the like, and an output device such as, for example, a printer, a speaker, and the like. In some embodiments, the I/O device 1040 may include the display device 1060.

The power supply 1050 may provide power for operations of the electronic device 1000.

The display device 1060 may be connected to other components through buses or other communication links.

Aspects of the embodiments described herein may be applied to any display device and any electronic device including the touch panel. For example, aspects of the embodiments described herein may be applied to a mobile phone, a smart phone, a tablet computer, a digital television TV, a 3D TV, a personal computer PC, a home appliance, a laptop computer, a personal digital assistant PDA, a portable multimedia player PMP, a digital camera, a music player, a portable game console, a navigation device, or the like.

The foregoing is illustrative of embodiments supported by the present disclosure and is not to be construed as limiting thereof. Although example embodiments supported by the present disclosure have been described, those skilled in the art will readily appreciate that many modifications are possible in the embodiments without materially departing from the novel teachings and advantages supported by the present disclosure. Accordingly, all such modifications are intended to be included within the scope of the embodiments supported by the present disclosure as defined in the claims. In the claims, means-plus-function clauses are intended to cover the structures described herein as performing the recited function and not only structural equivalents but also equivalent structures. Therefore, it is to be understood that the foregoing is illustrative of the aspects of the present disclosure and is not to be construed as limited to the specific embodiments disclosed, and that modifications to the disclosed embodiments, as well as other embodiments, are intended to be included within the scope of the appended claims. Embodiments supported by the present disclosure are defined by the following claims, with equivalents of the claims to be included therein.

What is claimed is:

1. A gate driver, comprising:

a first output stage through a N-th output stage; and a sensing stage, wherein:

each of the first output stage through the N-th output stage is configured to output a gate signal in response to a voltage of a control node, and the sensing stage:

comprises a hold transistor configured to turn on in response to the voltage of the control node, and is configured to sense a threshold voltage of the hold transistor of the sensing stage, wherein a compensation voltage is applied to a back gate electrode of the hold transistor of the sensing stage based on the sensed threshold voltage of the hold transistor of the sensing stage, and wherein:

each of the first output stage through the N-th output stage comprises a hold transistor configured to turn on in response to the voltage of the control node, and when the compensation voltage is applied to the back gate electrode of the hold transistor of the sensing stage, the compensation voltage is applied to a back gate electrode of each of the hold transistors of the first output stage through the N-th output stage.

2. The gate driver of claim 1, wherein the sensing stage further comprises:

a sensing transistor connected to an electrode of the hold transistor of the sensing stage and configured to turn on in response to the voltage of the control node.

3. The gate driver of claim 2, wherein the sensing transistor of the sensing stage is turned on when the hold transistor of the sensing stage is turned on.

4. The gate driver of claim 1, wherein the sensing stage is configured to sense the threshold voltage of the hold transistor of the sensing stage when a display device is turned on or turned off.

5. The gate driver of claim 1, wherein the sensing stage is configured to sense the threshold voltage of the hold transistor of the sensing stage when a display device is driven.

6. The gate driver of claim 1, wherein the hold transistor of the sensing stage is an N-channel metal-oxide-semiconductor (NMOS) transistor.

7. The gate driver of claim 1, wherein each of the first output stage through the N-th output stage comprises:

a first transistor comprising a gate electrode configured to receive a first carry clock signal, a first electrode configured to receive an input signal, and a second electrode connected to a first control node;

a second transistor comprising a gate electrode configured to receive a global control signal, a first electrode configured to receive a low gate voltage, and a second electrode connected to the first control node;

a third transistor comprising a gate electrode connected to the first control node, a first electrode configured to receive a high gate voltage, and a second electrode connected to a middle node of the first transistor and a middle node of the second transistor;

a fourth transistor comprising a gate electrode configured to receive a second carry clock signal, a first electrode connected to the first control node, and a second electrode;

a fifth transistor comprising a gate electrode connected to a second control node, a first electrode connected to the second electrode of the fourth transistor, and a second electrode configured to generate a carry signal;

a sixth transistor comprising a gate electrode connected to the first control node, a first electrode configured to receive the second carry clock signal, and a second electrode configured to generate the carry signal;

a seventh transistor comprising a gate electrode connected to the second control node, a first electrode configured to receive a second low gate voltage, a second electrode configured to generate the carry signal, and a back gate electrode configured to receive a second compensation voltage;

an eighth transistor comprising a gate electrode connected to the first control node, a first electrode configured to receive a gate clock signal, and a second electrode configured to generate a gate signal;

a ninth transistor comprising a gate electrode connected to the second control node, a first electrode configured to receive the low gate voltage, a second electrode configured to generate the gate signal, and a back gate electrode configured to receive a first compensation voltage;

a tenth transistor comprising a gate electrode configured to receive the high gate voltage, a first electrode configured to receive the high gate voltage, and a second electrode;

an eleventh transistor comprising a gate electrode connected to the second electrode of the tenth transistor, a first electrode configured to receive the high gate voltage, and a second electrode connected to the second control node;

a twelfth transistor comprising a gate electrode connected to the first control node, a first electrode configured to receive the second low gate voltage, and a second electrode connected to the second control node;

a thirteenth transistor comprising a gate electrode connected to the first control node, a first electrode configured to receive the low gate voltage, and a second electrode connected to the second electrode of the tenth transistor and the gate electrode of the eleventh transistor;

a first capacitor comprising a first electrode connected to the first control node, and a second electrode connected to the second electrode of the fifth transistor, the second electrode of the sixth transistor, and the second electrode of the seventh transistor; and a second capacitor comprising a first electrode connected to the second control node, and a second electrode connected to the second electrode of the tenth transistor, the gate electrode of the eleventh transistor, and the second electrode of the thirteenth transistor.

8. The gate driver of claim 1, wherein the sensing stage comprises:

a first transistor comprising a gate electrode configured to receive a first carry clock signal, a first electrode configured to receive an N-th gate signal, and a second electrode connected to a first control node;

a second transistor comprising a gate electrode configured to receive a global control signal, a first electrode configured to receive a low gate voltage, and a second electrode connected to the first control node;

a third transistor comprising a gate electrode connected to the first control node, a first electrode configured to receive a high gate voltage, and a second electrode connected to a middle node of the first transistor and a middle node of the second transistor;

a fourth transistor comprising a gate electrode configured to receive a second carry clock signal, a first electrode connected to the first control node, and a second electrode;

a fifth transistor comprising a gate electrode connected to a second control node, a first electrode connected to the second electrode of the fourth transistor, and a second electrode;

a sixth transistor comprising a gate electrode connected to the first control node, a first electrode configured to receive the second carry clock signal, and a second electrode connected to the second electrode of the fifth transistor;

a seventh transistor comprising a gate electrode connected to the second control node, a first electrode configured to receive a second low gate voltage, a second electrode connected to the second electrode of the fifth transistor and the second electrode of the sixth transistor, and a back gate electrode configured to receive a second compensation voltage;

an eighth transistor comprising a gate electrode connected to the first control node, a first electrode configured to receive a gate clock signal, and a second electrode;

a ninth transistor comprising a gate electrode connected to the second control node, a first electrode configured to receive the low gate voltage, a second electrode connected to the second electrode of the eighth transistor, and a back gate electrode configured to receive a first compensation voltage;

a tenth transistor comprising a gate electrode configured to receive the high gate voltage, a first electrode configured to receive the high gate voltage, and a second electrode;

an eleventh transistor comprising a gate electrode connected to the second electrode of the tenth transistor, a first electrode configured to receive the high gate voltage, and a second electrode connected to the second control node;

a twelfth transistor comprising a gate electrode connected to the first control node, a first electrode configured to receive the second low gate voltage, and a second electrode connected to the second control node;

a thirteenth transistor comprising a gate electrode connected to the first control node, a first electrode configured to receive the low gate voltage, and a second electrode connected to the second electrode of the tenth transistor and the gate electrode of the eleventh transistor;

a first capacitor comprising a first electrode connected to the first control node and a second electrode connected to the second electrode of the fifth transistor, the second electrode of the sixth transistor, and the second electrode of the seventh transistor;

a second capacitor comprising a first electrode connected to the second control node and a second electrode connected to the second electrode of the tenth transistor, the gate electrode of the eleventh transistor, and the second electrode of the thirteenth transistor;

a first sensing transistor comprising a gate electrode configured to receive a voltage of the second control node, a first electrode connected to the second electrode of the eighth transistor and the second electrode of the ninth transistor, and a second electrode configured to generate a first sensing current; and a second sensing transistor comprising a gate electrode configured to receive the voltage of the second control node, a first electrode connected to the second electrode of the fifth transistor, the second electrode of the sixth transistor, and the second electrode of the seventh transistor, and a second electrode configured to generate a second sensing current.

9. A display device, comprising:

a display panel comprising pixels;

a gate driver configured to provide gate signals to the pixels; and a driving controller configured to control the gate driver, wherein the gate driver comprises:

a first output stage through a N-th output stage; and a sensing stage, wherein:

each of the first output stage through the N-th output stage is configured to output a gate signal in response to a voltage of a control node, and the sensing stage:

comprises a hold transistor configured to turn on in response to the voltage of the control node, and is configured to sense a threshold voltage of the hold transistor of the sensing stage, wherein a compensation voltage is applied to a back gate electrode of the hold transistor of the sensing stage based on the sensed threshold voltage of the hold transistor of the sensing stage, and wherein:

each of the first output stage through the N-th output stage comprises a hold transistor configured to turn on in response to the voltage of the control node, and when the compensation voltage is applied to the back gate electrode of the hold transistor of the sensing stage, the compensation voltage is applied to a back gate electrode of each of the hold transistors of the first output stage through the N-th output stage.

10. The display device of claim 9, wherein the sensing stage further comprises:

a sensing transistor connected to an electrode of the hold transistor of the sensing stage and configured to turn on in response to the voltage of the control node.

11. The display device of claim 10, wherein the sensing transistor of the sensing stage is turned on when the hold transistor of the sensing stage is turned on.

12. The display device of claim 9, wherein the sensing stage is configured to sense the threshold voltage of the hold transistor of the sensing stage when the display device is turned on or turned off.

13. The display device of claim 9, wherein the sensing stage is configured to sense the threshold voltage of the hold transistor of the sensing stage when the display device is driven.

14. The display device of claim 9, wherein the each of the first output stage through the N-th output stage comprises:

a first transistor comprising a gate electrode configured to receive a first carry clock signal, a first electrode configured to receive an input signal, and a second electrode connected to a first control node;

a second transistor comprising a gate electrode configured to receive a global control signal, a first electrode configured to receive a low gate voltage, and a second electrode connected to the first control node;

a third transistor comprising a gate electrode connected to the first control node, a first electrode configured to receive a high gate voltage, and a second electrode connected to a middle node of the first transistor and a middle node of the second transistor;

a fourth transistor comprising a gate electrode configured to receive a second carry clock signal, a first electrode connected to the first control node, and a second electrode;

a fifth transistor comprising a gate electrode connected to a second control node, a first electrode connected to the second electrode of the fourth transistor, and a second electrode configured to generate a carry signal;

a sixth transistor comprising a gate electrode connected to the first control node, a first electrode configured to receive the second carry clock signal, and a second electrode configured to generate the carry signal;

a seventh transistor comprising a gate electrode connected to the second control node, a first electrode configured to receive a second low gate voltage, a second electrode configured to generate the carry signal, and a back gate electrode configured to receive a second compensation voltage;

an eighth transistor comprising a gate electrode connected to the first control node, a first electrode configured to receive a gate clock signal, and a second electrode configured to generate a gate signal;

a ninth transistor comprising a gate electrode connected to the second control node, a first electrode configured to receive the low gate voltage, a second electrode configured to generate the gate signal, and a back gate electrode configured to receive a first compensation voltage;

a tenth transistor comprising a gate electrode configured to receive the high gate voltage, a first electrode configured to receive the high gate voltage, and a second electrode;

an eleventh transistor comprising a gate electrode connected to the second electrode of the tenth transistor, a first electrode configured to receive the high gate voltage, and a second electrode connected to the second control node;

a twelfth transistor comprising a gate electrode connected to the first control node, a first electrode configured to receive the second low gate voltage, and a second electrode connected to the second control node;

a thirteenth transistor comprising a gate electrode connected to the first control node, a first electrode configured to receive the low gate voltage, and a second electrode connected to the second electrode of the tenth transistor and the gate electrode of the eleventh transistor;

a first capacitor comprising a first electrode connected to the first control node, and a second electrode connected to the second electrode of the fifth transistor, the second electrode of the sixth transistor, and the second electrode of the seventh transistor; and a second capacitor comprising a first electrode connected to the second control node, and a second electrode connected to the second electrode of the tenth transistor, the gate electrode of the eleventh transistor, and the second electrode of the thirteenth transistor.

15. The display device of claim 9, wherein the sensing stage comprises:

a first transistor comprising a gate electrode configured to receive a first carry clock signal, a first electrode configured to receive an N-th gate signal, and a second electrode connected to a first control node;

a second transistor comprising a gate electrode configured to receive a global control signal, a first electrode configured to receive a low gate voltage, and a second electrode connected to the first control node;

a third transistor comprising a gate electrode connected to the first control node, a first electrode configured to receive a high gate voltage, and a second electrode connected to a middle node of the first transistor and a middle node of the second transistor;

a fourth transistor comprising a gate electrode configured to receive a second carry clock signal, a first electrode connected to the first control node, and a second electrode;

a fifth transistor comprising a gate electrode connected to a second control node, a first electrode connected to the second electrode of the fourth transistor, and a second electrode;

a sixth transistor comprising a gate electrode connected to the first control node, a first electrode configured to receive the second carry clock signal, and a second electrode connected to the second electrode of the fifth transistor;

a seventh transistor comprising a gate electrode connected to the second control node, a first electrode configured to receive a second low gate voltage, a second electrode connected to the second electrode of the fifth transistor and the second electrode of the sixth transistor, and a back gate electrode configured to receive a second compensation voltage;

an eighth transistor comprising a gate electrode connected to the first control node, a first electrode configured to receive a gate clock signal, and a second electrode;

a ninth transistor comprising a gate electrode connected to the second control node, a first electrode configured to receive the low gate voltage, a second electrode connected to the second electrode of the eighth transistor, and a back gate electrode configured to receive a first compensation voltage;

a tenth transistor comprising a gate electrode configured to receive the high gate voltage, a first electrode configured to receive the high gate voltage, and a second electrode;

an eleventh transistor comprising a gate electrode connected to the second electrode of the tenth transistor, a first electrode configured to receive the high gate voltage, and a second electrode connected to the second control node;

a twelfth transistor comprising a gate electrode connected to the first control node, a first electrode configured to receive the second low gate voltage, and a second electrode connected to the second control node;

a thirteenth transistor comprising a gate electrode connected to the first control node, a first electrode configured to receive the low gate voltage, and a second electrode connected to the second electrode of the tenth transistor and the gate electrode of the eleventh transistor;

a first capacitor comprising a first electrode connected to the first control node and a second electrode connected to the second electrode of the fifth transistor, the second electrode of the sixth transistor, and the second electrode of the seventh transistor;

a second capacitor comprising a first electrode connected to the second control node and a second electrode connected to the second electrode of the tenth transistor, the gate electrode of the eleventh transistor, and the second electrode of the thirteenth transistor;

a first sensing transistor comprising a gate electrode configured to receive a voltage of the second control node, a first electrode connected to the second electrode of the eighth transistor and the second electrode of the ninth transistor, and a second electrode configured to generate a first sensing current; and a second sensing transistor comprising a gate electrode configured to receive the voltage of the second control node, a first electrode connected to the second electrode of the fifth transistor, the second electrode of the sixth transistor, and the second electrode of the seventh transistor, and a second electrode configured to generate a second sensing current.

16. An electronic device, comprising:

a display panel comprising pixels;

a gate driver configured to provide gate signals to the pixels;

a driving controller configured to control the gate driver; and a processor configured to control the driving controller, wherein the gate driver comprises:

a first output stage through a N-th output stage; and a sensing stage, wherein:

each of the first output stage through the N-th output stage is configured to output a gate signal in response to a voltage of a control node, and the sensing stage:

comprises a hold transistor, which is turned on in response to the voltage of the control node, and is configured to sense a threshold voltage of the hold transistor of the sensing stage, wherein a compensation voltage is applied to a back gate electrode of the hold transistor of the sensing stage based on the sensed threshold voltage of the hold transistor of the sensing stage, and wherein:

each of the first output stage through the N-th output stage comprises a hold transistor configured to turn on in response to the voltage of the control node, and when the compensation voltage is applied to the back gate electrode of the hold transistor of the sensing stage, the compensation voltage is applied to a back gate electrode of each of the hold transistors of the first output stage through the N-th output stage.

* * * * *